US 8,594,568 B2

(12) United States Patent
Falck

(10) Patent No.: US 8,594,568 B2
(45) Date of Patent: Nov. 26, 2013

(54) METHOD OF TRANSFERRING APPLICATION DATA FROM A FIRST DEVICE TO A SECOND DEVICE, AND A DATA TRANSFER SYSTEM

(75) Inventor: Thomas Falck, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 935 days.

(21) Appl. No.: 12/299,820

(22) PCT Filed: Apr. 18, 2007

(86) PCT No.: PCT/IB2007/051385
§ 371 (c)(1),
(2), (4) Date: Nov. 6, 2008

(87) PCT Pub. No.: WO2007/129237
PCT Pub. Date: Nov. 15, 2007

(65) Prior Publication Data
US 2009/0247080 A1    Oct. 1, 2009

(30) Foreign Application Priority Data

May 8, 2006 (EP) .................................. 06113611

(51) Int. Cl.
*H04B 7/00* (2006.01)
(52) U.S. Cl.
USPC ...... 455/41.2; 455/41.1; 455/519; 455/414.3; 455/414.4; 455/412.1; 455/422.1; 455/11.1; 455/575.1; 455/100; 455/73; 340/5.64; 340/5.83; 340/537.12; 340/539.1; 340/573.1; 340/33; 340/10.33; 340/825.72; 340/539.27; 600/300; 600/301; 600/372; 600/528; 600/365
(58) Field of Classification Search
CPC .............. H04B 13/005; H04L 12/2801; B60R 25/2027; G07C 9/00111
USPC .............. 455/41.2, 41.1, 519; 340/5.64, 5.83, 340/539.12, 539.1, 825.72, 33, 573.1, 340/10.33; 600/300, 301
See application file for complete search history.

(56) References Cited

U.S. PATENT DOCUMENTS 5,914,701 A * 6/1999 Gersheneld et al. .......... 345/156
6,104,913 A * 8/2000 McAllister ................... 455/41.1
(Continued)

FOREIGN PATENT DOCUMENTS

EP    1024626 A1    8/2000
EP    1274038 A1    1/2003
(Continued)

OTHER PUBLICATIONS

T. G. Zimmermann: Personal Area Networks: Near-Field Intrabody Communication, IBM Systems Journal, vol. 35, No. 3&4, 1996.

*Primary Examiner* — Fayyaz Alam
*Assistant Examiner* — Ganiyu A Hanidu

(57) ABSTRACT

The invention describes a method of transferring application data ($F_1$, $F_2$) from a first device ($D_s$) to a second device ($D_{T1}$, $D_{T2}$), which method comprises exchanging, through the body of a user (2) touching a touch interface (210) of the first device ($D_s$), connection-related data (4) between the first device ($D_s$) and a memory device (1), which memory device (1) is conveyed on the person of the user (2). Application data ($F_1$, $F_2$) is transferred from the first device ($D_s$) to the memory device (1) over a connection, between the first device ($D_s$) and the memory device (1), established on the basis of the connection-related data (4), and stored in a memory (220) of the memory device (1). The method subsequently comprises exchanging connection-related data (4) between the memory device (1) and the second device ($D_{T1}$) through the body of the user (2) touching a touch interface (230) of the second device ($D_{T1}$, $D_{T2}$), and at least part of the application data ($F_1$, $F_2$) being transferred from the memory (220) of the memory device (1) to the second device ($D_{T1}$, $D_{T2}$) over a connection, between the memory device (1) and the second device ($D_{T1}$, $D_{T2}$), established on the basis of the connection-related data (4). The invention further describes a data transfer system (20), a device ($D_s$, $D_{T1}$, $D_{T2}$) for utilizing application data ($F_1$, $F_2$), a memory device (1) and a data transfer front end (3").

13 Claims, 9 Drawing Sheets

(56) References Cited

U.S. PATENT DOCUMENTS

| | | | |
|---|---|---|---|
| 6,211,799 B1* | 4/2001 | Post et al. | 341/33 |
| 6,223,018 B1* | 4/2001 | Fukumoto et al. | 455/41.1 |
| 6,275,500 B1* | 8/2001 | Callaway et al. | 370/449 |
| 6,754,472 B1* | 6/2004 | Williams et al. | 455/100 |
| 6,771,161 B1* | 8/2004 | Doi et al. | 340/5.64 |
| 7,069,444 B2* | 6/2006 | Lowensohn et al. | 713/185 |
| 7,082,316 B2* | 7/2006 | Eiden et al. | 455/519 |
| 7,542,720 B2* | 6/2009 | Yoda et al. | 455/41.1 |
| 2001/0006523 A1* | 7/2001 | Kriens | 370/401 |
| 2002/0128030 A1 | 9/2002 | Eiden et al. | |
| 2003/0017846 A1* | 1/2003 | Estevez et al. | 455/556 |
| 2003/0036351 A1 | 2/2003 | Forbes | |
| 2004/0100976 A1* | 5/2004 | Chang et al. | 370/401 |
| 2005/0017841 A1 | 1/2005 | Doi et al. | |
| 2008/0298603 A1* | 12/2008 | Smith | 381/67 |
| 2009/0062930 A1* | 3/2009 | Aureli | 700/7 |

FOREIGN PATENT DOCUMENTS

| | | |
|---|---|---|
| JP | 2004127173 A | 4/2004 |
| JP | 2004260800 A | 9/2004 |
| JP | 2006081025 A | 3/2006 |
| WO | 2004114100 A1 | 12/2004 |
| WO | 2006006636 A1 | 1/2006 |

* cited by examiner

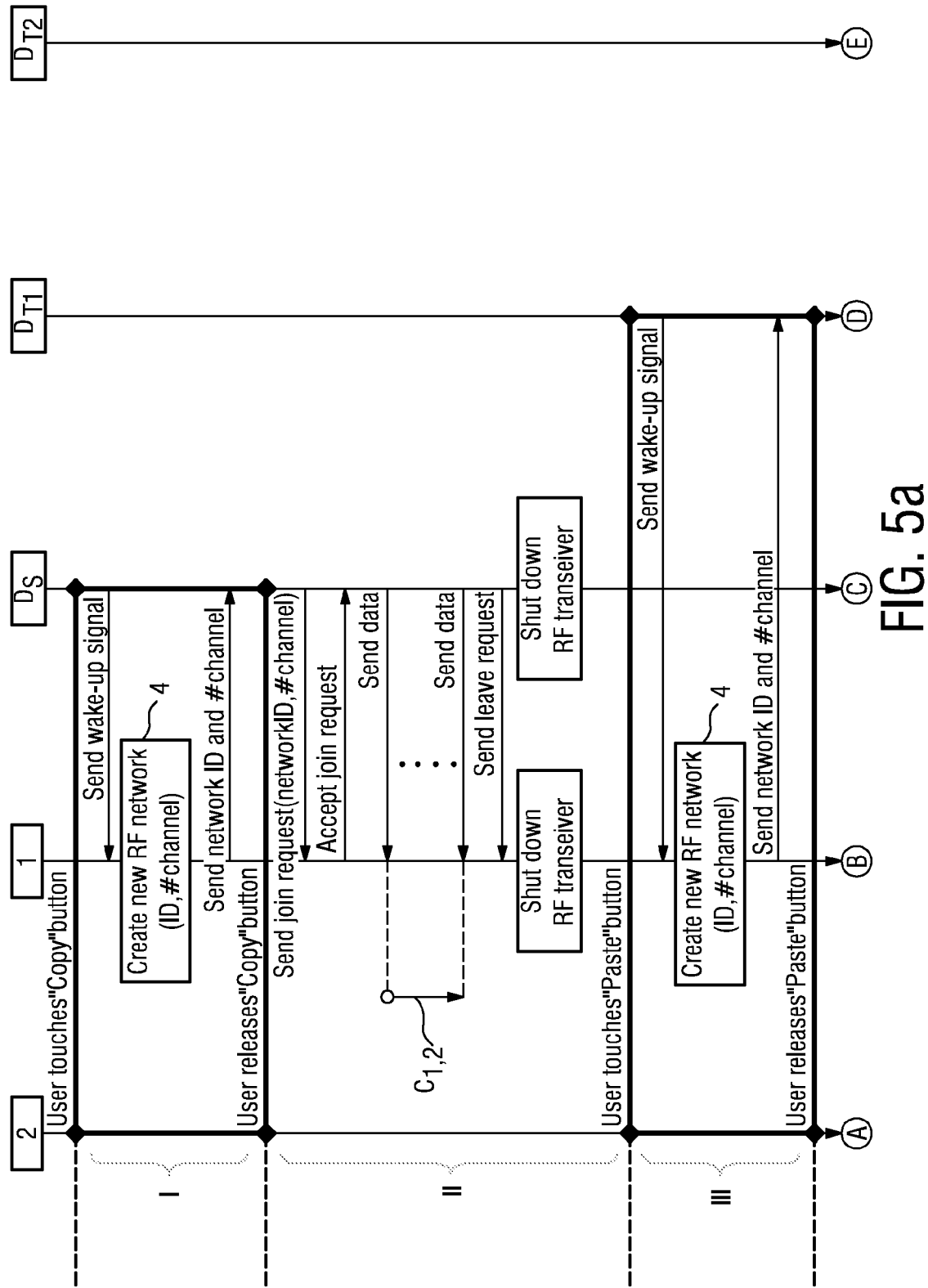

METHOD OF TRANSFERRING APPLICATION DATA FROM A FIRST DEVICE TO A SECOND DEVICE, AND A DATA TRANSFER SYSTEM

FIELD OF THE INVENTION

The invention relates to a method of transferring application data from a first device to a second device, and to a data transfer system.

The invention also relates to a device for utilising application data, and to a memory device for intermediate storage of application data transferable with such a data transfer method.

Furthermore, the invention relates to a data transfer front end.

BACKGROUND OF THE INVENTION

Utilisation of data in electronic form has become a part of everyday life. Most people are well acquainted with documents, music, videos etc., being available as application data in electronic form such as Word documents, MP3 music files, MPEG movie files, etc. Many users of electronic devices such as personal computers (PCs), portable music players, digital cameras etc. are also used to the concept of copying application data from one device to another, for example copying Word files from one PC to another. Application data can often be utilised on more than one device, or on more than one type of device. An example is given by any Word document, which can be processed on any personal computer, or by an MP3 file, which can be played on a personal computer as well as on a portable music player, or by a digital image file, which can be created on a digital camera and transferred to a personal computer for image processing.

OBJECT AND SUMMARY OF THE INVENTION

There are various ways of transferring application data from one device to another. One of the simplest is over a direct physical connection, e.g. an interface cable. However, if it is not possible to physically connect the two devices, for example if the devices are in different locations, data can first be copied from the data source device onto an intermediate storage media such as a diskette, compact disc (CD) or memory stick, and the intermediate storage device can then be brought to the target device, where the data is then copied. However, the memory capacity of a diskette is not very large, and writing to a diskette is generally quite slow. Furthermore, diskettes can be easily damaged, and data can be lost if the diskette is exposed to a magnetic field. Writing data to a CD (also called burning) is faster, but this can only be done once. Read/write CDs are available, but they are expensive. Another disadvantage, common to diskette and CD, is that these are relatively large.

In the meantime, the use of memory sticks has become widespread, since they are small, convenient and fast. Such memory sticks are also commonly called "USB sticks", due to the universal serial bus (USB) interface by means of which these memory sticks interface to a device such as a personal computer. Their popularity is largely due to their ease of use and to the practical possibilities offered by the USB type interface. A personal computer generally only has a single diskette or compact disc drive, whereas it can easily accommodate a number of USB slots or a USB hub, so that a memory stick can be simply inserted into a free slot. Other, smaller, devices which generate or render application data, for example a digital camera or a portable music player, are often equipped with a USB interface for copying data to or from the device. Therefore, it is to be expected that the popularity of memory sticks as intermediate storage devices will increase even further.

However, the use of a memory stick to transfer data from one device to another is not entirely free of the disadvantages common to all state-of-the-art intermediate storage media. For a user who frequently transfers data between devices, there is the obvious disadvantage that, for each data transfer, he must insert his memory stick into the—not always easily accessible—USB slot, copy the data onto the stick, remove the memory stick from the USB interface, and repeat the process at the target device to transfer the data from the memory stick to the target device. Also, if the memory stick is being used to transfer data to a number of different destinations, the user must, for each transfer, examine the contents of the memory stick, for example using Windows Explorer, to select the files intended for each destination device. Another disadvantage is that, being small and compact, such a memory stick can easily be left in the USB interface of a device and forgotten.

Therefore, it is an object of the invention to provide an easy and comfortable method of transferring data from a source device to a target device, while avoiding the problems described above.

To this end, the present invention provides a method of transferring application data from a first device to a second device, which method comprises a user touching a touch interface of the first device, and, while user is touching the device, connection-related data being then exchanged through the body of the user between the first device and a memory device. The memory device is thereby conveyed on the person of the user, for example in a pocket. Based on the connection-related data, a connection for exchanging application data is established between the first device and the memory device. Application data is subsequently transferred from the first device to the memory device over this connection, and then stored in a memory of the memory device.

In the following, the term "touch" is used to describe the contact made between the user and a source or target device. The contact must be such that connection-related data can be exchanged between the device being touched and the memory device carried on the person of the user. The nature of the contact or touch might depend on the realisation of device's touch interface, so that one type of device might require that the user press, for example, a finger tip or thumb in a touchable region and maintain this contact for the duration of the exchange. The touch interface of another type of device might be realised so that the user need only approach it with his fingertip for the connection-related data to be exchanged, i.e. a physical contact might not be required. A pre-requisite might be that the user bring his fingertip sufficiently close to the touch interface, so that the region at which he is pointing can be determined by the touch interface. The sensitivity of the touch interface might be configured so that it only reacts when the user has clearly made contact with a region in the touch interface, and not when the user happens to pass his hand over the touch interface but at a distance removed from the touch interface.

In a next step, the user touches a touch interface of the second device and connection-related data is exchanged between the memory device and the second device through the body of the user, so that a connection for exchanging application data is established between the memory device and the second device, based on the connection-related data. Subsequently, at least part of the application data is transferred, over this connection, from the memory of the memory device to the second device. Transfer of application data to and from the memory device can take place through the body of the user, or over a connection established between the memory device and the first or second device.

A memory device according to the invention, used for intermediate storage of application data in a transfer from the first to the second device, comprises a connection interface for exchanging connection-related parameters with the first or second device through the body of the user. Such an interface can comprise a transceiver for body-coupled communication (BCC). In recent years, considerable developments have been made in the field of data transmission through the human body, for example as described in the publication "Personal Area Networks: Near-field intrabody communication" (T. G. Zimmermann, IBM Systems Journal, Vol. 35, Nos. 3&4, 1996). A person skilled in the art will be familiar with the required technology, which need not be explained in more detail here.

To receive application data from the first device and to transmit application data to the second device, the memory device preferably comprises a suitable data transfer arrangement working to transfer application data over a connection established using the previously exchanged connection-related parameters. The memory device also preferably comprises a memory module or unit for storing the application data. Owing to its function, the memory device is also referred to as "data carrier" or "intermediate storage device" in the following.

The first and second devices mentioned here can be any kind of electronic device for processing application data, such as a personal computer, home entertainment device, personal digital assistant, portable music player, etc. In the following, for the sake of simplicity, the first device and second devices will be referred to as "source device" and "target device" respectively. Obviously, a device can be equipped to act as source device when transferring application data to a memory device, and as target device when receiving application data from a memory device. To be able to transfer application data to or from a memory device, such a source or target device must also avail of the necessary touch interface and connection interface combination for exchanging connection-related data between the device and the memory device and a data transfer arrangement, e.g. a suitable transceiver, for transferring application data over a connection established on the basis of the connection-related data. A touch interface and connection interface combination can be a single module, or can comprise two separate or distinct modules which nevertheless work in conjunction with one another. "Application data" can be any file or document in any format, such as a Word file, an image file, a PDF file, an MPEG file, an executable file, etc., and may be referred to in the following simply as "file" or "files". The touch interface and connection interface combination, as well as the data transfer arrangement, may be integrated in the device or may be integrated in an external data transfer front end connected to the device, as will be explained below.

A suitable data transfer system for transferring application data between a first device and a second device comprises a memory device for conveyance on the person of a user, which memory device in turn comprises a memory for intermediate storage of application data, a connection interface for exchanging connection-related data with a device through the body of a user, and a data transfer arrangement for receiving application data from a first device and for transmitting application data to a second device over a connection established on the basis of the connection-related data. Assigned to the first device, the data transfer system comprises a touch interface and connection interface combination for exchanging connection-related data between the first device and a memory device through the body of the user and a data transfer arrangement for transmitting application data from the first device to the memory device over a connection established on the basis of the connection-related data. Similarly, assigned to the second device, the data transfer system comprises a touch interface and connection interface combination for exchanging connection-related data between the second device and a memory device through the body of the user, and a data transfer arrangement for transmitting application data from the memory device to the second device over a connection established on the basis of the connection-related data.

The method according to the invention is particularly advantageous since the data transfer is initiated by a simple touch operation on the part of the user. This "just touch" interaction for exchanging network parameters, using the human body as a signal transmission medium, is extremely simple to use and completely intuitive. Another obvious advantage of the method according to the invention is that, since application data is transferred wirelessly to and from the memory device, the user does not need to physically connect the memory device itself into an interface socket of either the source or target devices. The data transfer is carried out in a comfortable, intuitive, and easy manner. Since the user can carry the memory device on his person, for example in a jacket or trouser pocket, he is spared the exertion of having to insert the memory device into an interface of the first or second devices. Furthermore, since the memory device remains on the person of the user, it cannot be left forgotten in a device interface.

The dependent claims and the subsequent description disclose particularly advantageous embodiments and features of the invention.

As mentioned above, technological developments in recent years in the field of intrabody communication (i.e. data transfer through the human body) have made it possible for data to be successfully transferred from a source device to a destination device, using the human body as a carrier. Broadly speaking, it is essentially possible to transmit application data between the memory device and a source or target device, through the body of the user, over a connection established on the basis of the connection-related data already exchanged through the user's body.

On the other hand, owing to obvious limitations, the human body is not very suitable for data transfer at high power or high frequencies. However, it is feasible for data to be transferred at a low frequency and at low power, as long as the user maintains physical contact with the source device. Therefore, in the method according to the invention, only connection-related data is transferred through the body of the user, since the relatively small quantity of data is exchanged within a brief time period.

Furthermore, in a particularly preferred embodiment of the invention, once connection-related parameters have been exchanged, a wireless radio network is established between the memory device and the corresponding source or target device using these parameters. This procedure is described by the appropriate standard, and comprises the exchange of predefined signals or messages understandable by the transceivers, such as "join" and "accept" requests, with which the device addresses can be exchanged. Such procedures and standards will be familiar to a person skilled in the art. Once the network is successfully established, application data can be transferred between the memory device and the source or target device over the wireless radio connection. During transfer of application data, the user should remain within range of the transceivers. Completion of transfer might be indicated by an audible or visible signal, such as a beep or a flashing LED (light-emitting diode).

Various standards have been established for wireless radio communication over short distances, for example the IEEE 802.11 (Wireless LAN) and IEEE 802.15 (Wireless PAN) standard. A network of devices close to a person (generally at a distance of a few meters) is called a personal area network, or PAN. When these communicate in a wireless manner, the network is termed a wireless PAN, or WPAN. Several network technologies have been developed for wireless personal area networks. One of the most well-known is Bluetooth, allowing different devices to communicate with one another. Another, more recent, technology is the ZigBee standard, which can be simpler to implement, allowing the realisation of low-cost devices.

To communicate wirelessly with one another, two or more devices need to obtain network- or connection-related data such as the frequency of the radio channel over which they are to exchange data, the network identifier (ID), device addresses for each of the devices, etc. As explained above, in the method according to the invention, these network parameters are exchanged through the body of the user using intra-body signalling, for example by capacitive coupling of extremely low (pico-amp) currents through the body. This is achieved when the user touches, for example with his finger-tip, a touchable region on the touch interface of a source or target device, and maintains contact with the touchable region for the duration of the exchange. The touch interface of a source/target device can be, for example, a dedicated region on a display, keyboard, or other area of the device, a button, a touch pad, etc. Since the amount of data required to characterise a connection is relatively small, the duration of the exchange, and therefore of the contact between user and source/target device, can be correspondingly short. Once the network parameters have been exchanged between the source or target device and the memory device through the body of the user, the user can break contact, for example by removing his finger-tip from the touch interface of the device.

The type of contact made by the user with the device while the network parameters are being exchanged between the device and the memory device, can in itself carry information about the direction of transfer or type of transfer that is to be carried out. For example, a "copy" type transfer indicates a transfer from a source device to the memory device. On the other hand, a "paste" type transfer indicates a transfer from the memory device to a target device. These functions will be well-known to any user of a personal computer or similar device, and are used as clipboard functions in almost every application for processing data, such as a word processor, an image processing application, etc. Furthermore, if the touch interface comprises dedicated regions for different transfer types—copy, paste, move—information about which region the user has touched can be analysed by the touch interface to determine the direction and type of transfer. Alternatively, for a simpler realisation, the user might touch the touch interface once to indicate a copy transfer, twice for a paste transfer, and three times for a move transfer. For example, the user might tap the touch interface three times to indicate that a selected file is to be moved, i.e. first copied to the memory device and then deleted from the source device, before holding his finger-tip pressed to the touch interface to allow the network parameters to be exchanged. Suitable circuitry or detectors might be incorporated in the touch interface to detect the different type of touch sequences made by the user. It is also conceivable that the touch interface be realised so that the user can indicate the type of transfer by "writing" with his finger-tip in the touch interface, for example by dragging his finger-tip in the form of a "C" in the touch interface to indicate a "copy" transfer, while the connection parameters are being exchanged.

Therefore, in a preferred embodiment of the invention, a touch interface of a source or target device might comprise a number of touchable regions for a corresponding number of distinct application data transfer types—such as "copy", "paste", and/or "move" —between the device and a memory device. Alternatively, a touch interface might comprise a suitable detection unit for detecting the type or sequence of contact made by the user with the touch interface to determine which of a variety of transfer types has been indicated by the user. In one relatively simple embodiment of the invention, any selected files, or any currently open or active files, can be automatically transferred to the memory device when the user touches the touchable "copy" or "move" region of the touch interface of a device, and all data currently stored in the memory device are transferred to the device if the user touches the touchable "paste" region of the touch interface of a device. In this kind of embodiment, the memory device acts as a simple "clipboard", the function of which will be familiar to any user of a personal computer.

As already mentioned above, application data transferred from a source device to the memory device can have more than one target device as destination. For example, a single file might be intended for more than one target device. Alternatively, one file might be intended for a first target device while another file is intended for a second target device. One of the advantages of the invention is that application data can automatically be transferred to the intended target device without the user having to browse the contents of the memory device to select a file for transfer to the appropriate target device. In a particularly preferred embodiment of the invention, a label specifying certain transfer parameters or conditions is created for the application data, and the label is transferred with the application data to the memory device. For example, the label can be created at the point where a user has selected a file on the source device, before the application data is transferred to the memory device. The label can specify the target device for which the file is intended, making it easy for the user to copy, paste, or move different files—transferred to the memory device in a single session from the source device—to a number of different target devices. For instance, a user can specify a portable music player as the intended target for a selection of music files, his car stereo as the intended target for the same or other music files, a home entertainment system as the intended target for a video file, and another PC as the intended target for spreadsheet or text documents. Then he can transfer all the files, in one session, to his memory device. Thereafter, by simply touching the touch interfaces of the target devices in turn, the application data intended for the relevant target device will be transferred automatically. Needless to say, the target devices can be located anywhere, and the user can effect the data transfer from the memory device to one of the target devices at any convenient time when in the vicinity of that target device.

Furthermore, a label can specify a lifetime for a file on the intended target device or on the memory device. After expiry of such a lifetime, the application data might automatically be marked as invalid. A label might also specify the number of times a file can be transferred from the memory device to a target device. Suitable software on the source device can allow, for instance, automatic generation of labels for files stored by the user in certain folders of the computer's file management system. For example, when the user moves or drops a music file into a folder called "music for player", the software might automatically generate the corresponding label for the file, indicating a portable music player as the target device. It is also conceivable that the user might be able to specify a destination by speaking the destination, for example by clicking on a music file icon and saying "player" to indicate the destination for this file.

The memory device according to the invention is preferably realised to be conveyable on the person of the user. However, since most users of application data already often carry one or more portable devices with them, for example a PDA, a mobile telephone, etc., one advantageous type of realisation might be to combine the memory device with one or more such devices, for example a mobile telephone incorporating an in-built memory device according to the invention.

The memory device according to the invention does not need to be physically connected to a data interface of a source or target device in order to transfer application data, since network-related parameters are exchanged through the body of the user. However, it might be that not all devices are equipped with the means to communicate with a memory device using body-coupled communication. To allow for such an eventuality, the memory device might also be realised with an interface connector such as a USB connector, so that the memory device can also be used for intermediate data storage for application data obtained from or intended for these devices, by directly inserting the memory device into an interface socket of the device.

To allow for an easy upgrade of source or target devices that do not have a touch interface, the invention also describes a data transfer front end to interface between such a device and a memory device. Such a front end might be a portable module that can be simply connected to the device using one of the available device interfaces, e.g. a USB port or a serial port. Once the front end has been connected to the device, data transfer between the device and a memory device, as described above, can take place in the manner already described. To this end, the data transfer front end comprises a touch interface and connection interface combination to allow connection-related data or parameters to be exchanged between the device and the memory device. Furthermore, the front end comprises a data interface for transferring application data from the device to the data transfer front end, i.e. for downloading files from the device, or for uploading files to the device, using a connection established on the basis of the connection-related data. To transfer application data between the data transfer front end and the memory device, the front end therefore also comprises a data transfer arrangement with which it can exchange application data with the memory device. With the aid such a data transfer front end, it is possible for a device, which otherwise does not avail of the necessary interfaces, to be used as a source or target device in a data transfer system according to the invention.

BRIEF DESCRIPTION OF THE DRAWINGS

Other objects and features of the present invention will become apparent from the following detailed descriptions considered in conjunction with the accompanying drawing. It is to be understood, however, that the drawings are designed solely for the purposes of illustration and not as a definition of the limits of the invention.

FIGS. 5a-5b show a message sequence chart for a transfer of data from a source device to a number of target devices;

DESCRIPTION OF EMBODIMENTS

In the diagrams, like numbers refer to like objects throughout.

Figure 1:
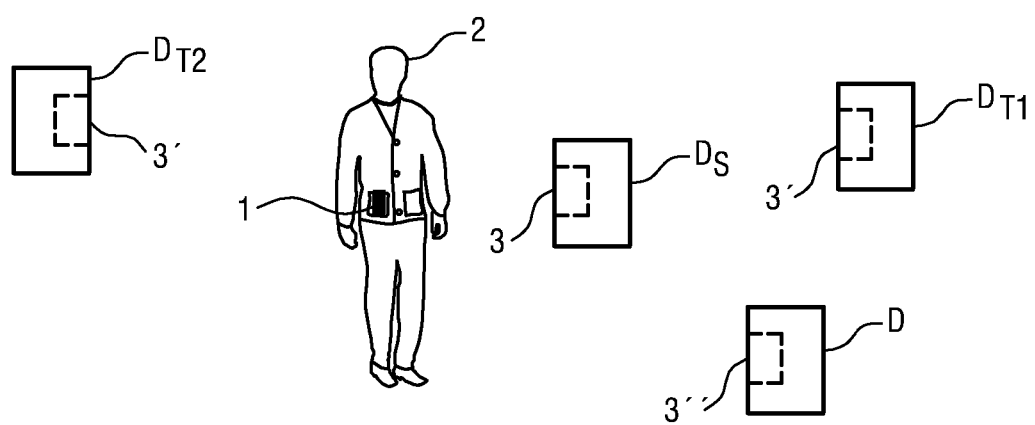
FIG. 1 shows a user conveying a memory device on his person, and a number of devices.

FIG. 1 shows a user 2 with a memory device 1 according to the invention, and a number of devices D, $D_S$, $D_{T1}$, $D_{T2}$. The user is shown to be carrying the memory device 1 in his pocket. However, the memory device 1 could be carried in any convenient location on the person of the user 2, for example incorporated into a shoe, or attached to or incorporated into a belt. For the purposes of illustration, the user 2 is shown in the vicinity of all of the devices D, $D_S$, $D_{T1}$, $D_{T2}$, but it will be understood that a data transfer, as will be explained in detail below, can take place between the memory device 1 and a single device D, $D_S$, $D_{T1}$, $D_{T2}$. Using the method according to the invention, the user 2 can cause a wireless radio connection or network to be established between the memory device 1 and one or more of the devices D, $D_S$, $D_{T1}$, $D_{T2}$, simply by touching any of the devices D, $D_S$, $D_{T1}$, $D_{T2}$ that is to be included in the network. Each of the devices D, $D_S$, $D_{T1}$, $D_{T2}$ avails of a suitable interface 3, 3', 3", explained in greater detail below, over which network-related data can be exchanged between the device D, $D_S$, $D_{T1}$, $D_{T2}$ and the memory device 1.

In a preferred method explained in detail above, data can be transferred between a devices and a memory device by the user first touching the device to allow network-related parameters for a wireless radio network to be exchanged between the device and the memory device, and subsequently transferring application data via a wireless radio network established using the network-related parameters.

Figure 2:
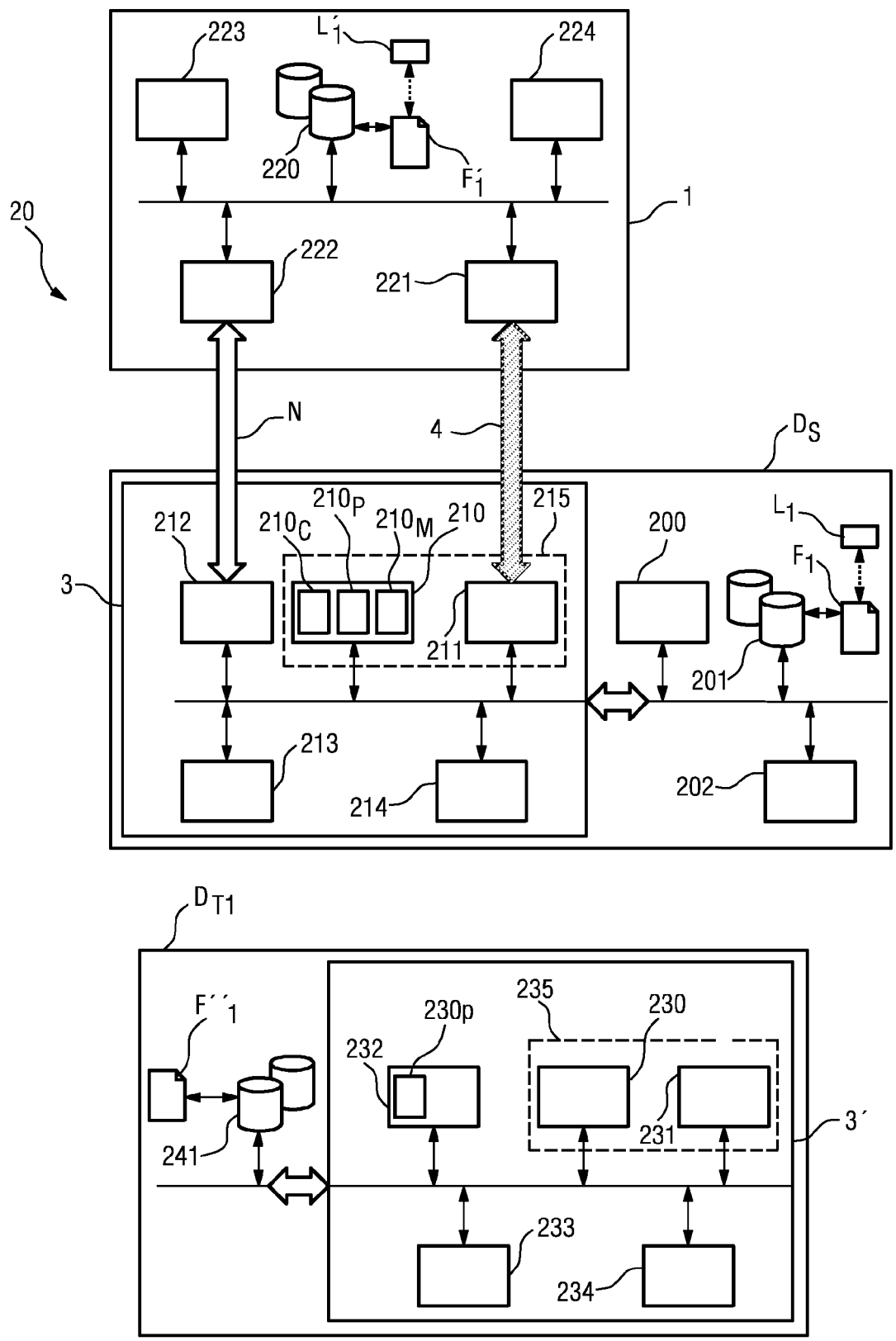
FIG. 2 is a block diagram of a data transfer system according to an embodiment of the invention.

The device and the memory device need to be equipped with the necessary units and modules for carrying out these steps, as shown in FIG. 2. Here, in a data transfer system 20, a device $D_S$ is shown which avails of a front end 3, a user interface 200 (e.g. a keyboard, mouse, graphical user interface), a memory 201, and a processor 202. Other modules or units which are generally incorporated into such a device, but not essential to the invention, are not shown in the diagram. The data transfer system 20 also comprises a memory device 1, and a target device $D_{T1}$, $D_{T2}$. Both source device $D_S$ and target device $D_{T1}$, $D_{T2}$ avail of a touch interface and connection interface combination 215, 235, which might be a touchable region in a display of the corresponding device, or certain buttons on the device, a region on the device housing, etc., and can be realised differently for each of the devices $D_S$, $D_{T1}$, $D_{T2}$. Here, the touch interface 210 of the source device $D_S$ has three separate touchable regions $210_C$, $210_P$, $210_M$. —a "copy" region $210_C$, a "paste" region $210_P$, and a "move" region $210_M$. In the touch interface 230 of the target device $D_{T2}$, the user can only avail of a paste region $230_P$. The touch interface and connection interface combinations 215, 235 can detect the type of touch made by the user, determine the corresponding type of transfer that is to be carried out, and issue a wake-up signal to the memory device 1.

To select the application data for transfer, a user can avail of, for example, the graphical user interface 200 of the device $D_S$ to indicate the file $F_1$, stored in the memory 201, which is to be transferred to the memory device 1. Here, the user has indicated that the file $F_1$ is to be transferred to the target device $D_{T1}$. Prior to this, at some appropriate time, a software program running on the source device $D_S$ has created a corresponding label $L_1$ denoting the device $D_{T1}$ as destination, and has linked this label $L_1$ in some suitable fashion to the file $F_1$, as indicated by the dotted line in the diagram.

When the user touches the touch interface 210 of the front end 3 of the device $D_S$, touch interface 210 notifies a BCC transceiver 211, which in turn causes an electrical circuit to be closed between the BCC transceiver 211 of the device $D_S$ and a BCC transceiver 221 of the memory device 1 carried by the user, over which circuit network parameters 4 can be exchanged at an extremely low current (typically in the region of pico-amperes), indicated by the cross-hatched arrow in the diagram. Once the network parameters 4 have been successfully exchanged, the user can break contact with the touch interface 210 of the front end 3, a fact which may be signalled to the user by a beep, a chime, a visual signal, or some other appropriate type of signal generated by software 214 in conjunction with a processor 213, and which can be perceived by the user.

The network parameters 4 exchanged between the device $D_S$ and the memory device 1 are forwarded to their respective radio-frequency transceivers 212, 222, which then establish a wireless radio network N between the device $D_S$ and the memory device 1, indicated by the white arrow, between the front end transceiver 212 and the memory device transceiver 222.

Once the wireless radio network N has been established, the file $F_1$ with its accompanying label $L_1$ are retrieved from the memory 201 of the device $D_S$, and are sent over the network N by the radio-frequency transceiver 212 of the front end 3. Security issues can be considered when sending by having the application data encrypted or encoded in an appropriate manner prior to transmission, so that only the memory device may decrypt or decode the data. The necessary information for the decryption or decoding may be exchanged with the network parameters 4. The radio-frequency transceiver 222 of the memory device 1 detects the sent signal and stores a copy $F'_1$ of the application data $F_1$ thus received in a memory 220 of the memory device 1, along with a copy $L'_1$ of the label $L_1$. The "copy" transfer is thus complete, and the radio network N can then be shut down. Software 224 in conjunction with a processor 223 of the memory device 1 can analyse the label $L'_1$ to determine the device for which the received data $F'_1$ is intended.

To transfer the application data $F'_1$ from the memory device 1 to the target device $D_{T1}$, $D_{T2}$, the user can touch a corresponding "paste" region in the touch interface 230 of the front end 3' of the target device $D_{T1}$, $D_{T2}$. In essentially the same way as described above, network parameters are exchanged between the BCC transceiver 221 of the memory device 1 and the BCC transceiver 231 of the front end 3' of the target device $D_{T1}$, $D_{T2}$, allowing the respective radio-frequency transceivers 222, 232 to establish a wireless radio network, not shown in the diagram, but essentially the same as described above. A processor 233 in conjunction with software 234 of the target device $D_{T1}$, $D_{T2}$ issues a request to the memory device 1, asking for and data which it might have for the target device $D_{T1}$. On the basis of the label $L'_1$ the memory device 1 recognises that the data $F'_1$ is intended for the target device $D_{T1}$, $D_{T2}$ and sends the file $F'_1$ over the wireless radio network. The radio-frequency signal is picked up by the RF transceiver 232 of the front end 3' of the target device $D_{T1}$, $D_{T2}$, and the incoming data is stored as a copy $F''_1$ of the original file $F_1$ in a memory 241. The "paste" transfer is thus concluded, and the radio network can be shut down.

Figure 3A:
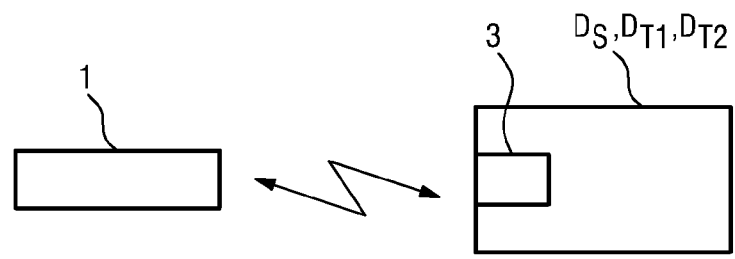
FIGS. 3a-3d are schematic diagrams of a number of realisations of a memory device and a device according to different embodiments of the invention.
Figure 3B:
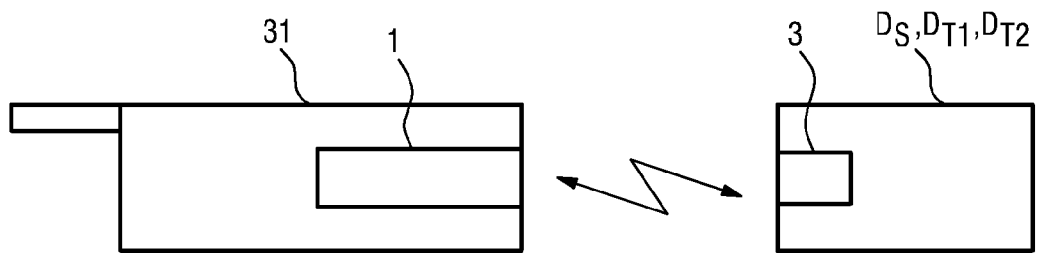
Figure 3C:
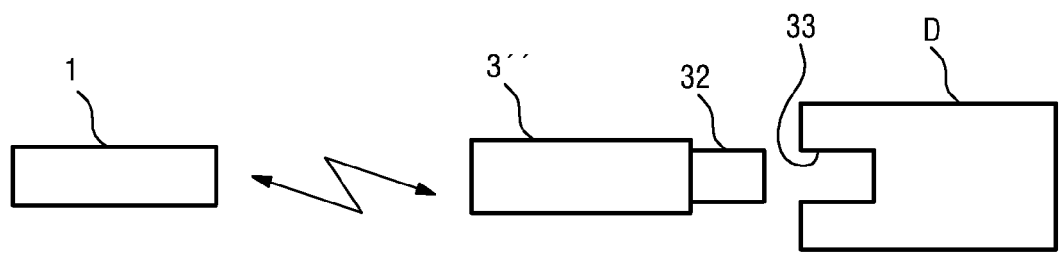

FIGS. 3a-3c show a number of different possible realisations of the memory device 1 according to the invention. In FIG. 3a, the memory device 1 is a stand-alone intermediate data storage device, and can be used for transferring data between a source or target device $D_S$, $D_{T1}$, $D_{T2}$. In this diagram, the source or target device $D_S$, $D_{T1}$, $D_{T2}$ are each assumed to have an in-built front end with touch interface, connection interface, wireless radio transceiver, etc., as described above.

FIG. 3b depicts a realisation in which the memory device 1 has been incorporated into another portable device 31, in this case a mobile phone 31. Again, the memory device 1 can be used to transfer application data between a source or target device $D_S$, $D_{T1}$, $D_{T2}$.

FIG. 3c shows a realisation for the case where a device D does not avail of a touch interface or connection interface. In this example, using a USB connector 32, a front end module 3'' can be inserted into the USB interface 33 of the device D, allowing application data to be transferred between a memory device 1 and the device D using the method according to the invention.

Figure 3D:
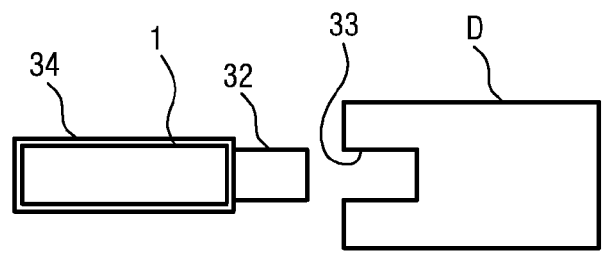

For use with a device D that is not equipped with a wireless radio transceiver, the memory device 1 can be realised with a suitable data transfer interface, as shown in FIG. 3d. Here, the memory device 1 is realised as a memory stick 34 equipped with a USB interface connector 32, and can therefore be simply used as a USB stick 34 to transfer data to or from a device D that is not capable of wireless data transfer.

The sequence of diagrams shown in FIGS. 4a-4k illustrate the steps taken by a user 2 to transfer application data $F_1$, $F_2$ from a source device $D_S$ to two separate target devices $D_{T1}$, $D_{T2}$. In the diagrams, for the purposes of illustration, the devices $D_S$, $D_{T1}$, $D_{T2}$ are represented by simple shapes and are shown in proximity. Naturally, the devices $D_S$, $D_{T1}$, $D_{T2}$ can be any of the devices mentioned in the previous description, such as a portable music player, home entertainment device, car stereo, personal computer, satellite receiver, any electrical appliance, etc. Furthermore, the source device $D_S$ can be at any distance from the target devices $D_{T1}$, $D_{T2}$. For the sake of clarity, the touch interfaces 210, 230 of the devices $D_S$, $D_{T1}$, $D_{T2}$ are not shown in detail, and simply indicated by dashed lines. A file stored in a memory of a device $D_S$, $D_{T1}$, $D_{T2}$ is simply indicated by the usual file symbol.

Figure 4A:
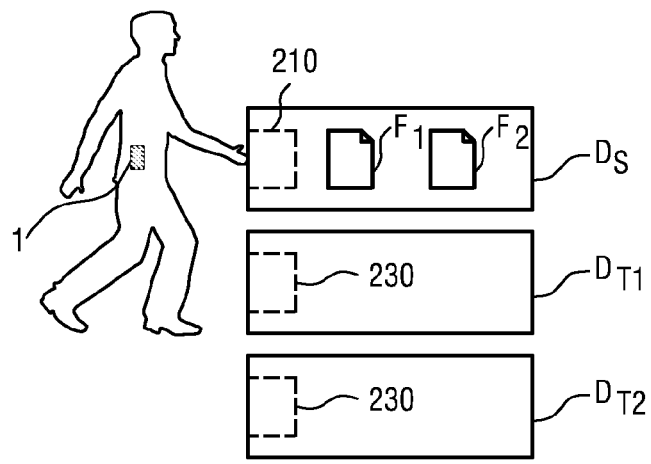
FIGS. 4a-4k show steps in a sequence of data transfer between a number of devices, according to an embodiment of the invention.
Figure 4B:
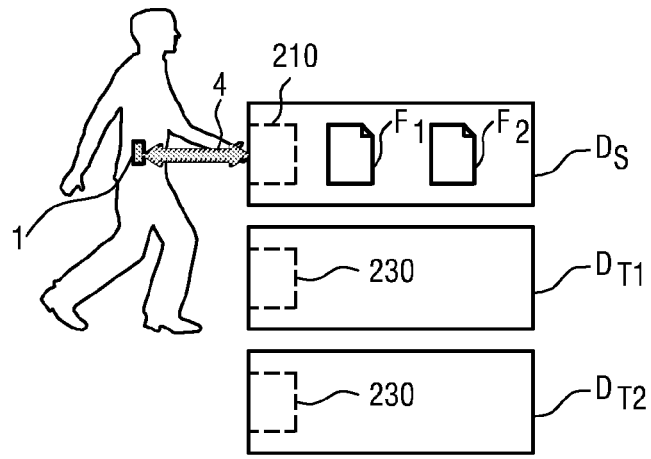

In FIG. 4a, the user 2 is shown to carry a wireless memory stick 1 on his person, in the pocket of his jacket. He intends to copy two files $F_1$, $F_2$ from the source device $D_S$. The user 2 can have marked the desired files $F_1$, $F_2$ for copying in any suitable manner, such as by clicking on them with a mouse, not shown in the diagram. Furthermore, the user 2 has specified the destination device for each of the files $F_1$, $F_2$ he wishes to copy. In this example, the first file $F_1$ is to be copied to a first target device $D_{T1}$, whereas the second file $F_2$ is to be copied to another, second, target device $D_{T2}$. To ensure that the files $F_1$, $F_2$ are copied to their correct intended destinations, the source device $D_S$ creates a first label for the first file $F_1$ and a second label for the second $F_2$. For the sake of clarity, the labels are not shown in the diagram.

The user touches the "copy" button on the touch interface 210 of the source device $D_S$. Triggered by that event, the connection interface of the source device $D_S$ wakes up its BCC-transceiver and instructs it to broadcast or send a wake-up signal through body-coupled communication. The BCC-transceiver of the memory device 1 wakes up by receiving the wake-up signal via body-coupled communication, indicated by the cross-hatched arrow in FIG. 4b. The BCC-transceivers of the memory device 1 and the source device exchange network parameters 4 (i.e. radio channel, network ID) through body-coupled communication. The user 2 can now remove his fingertip from the touch interface 210 of the source device $D_S$. The point in time at which he may remove his fingertip from the touch interface 210 may be indicated by a beep tone issued by the source device $D_S$. Control software of the memory device 1 and the source device $D_S$ instructs their RF-transceivers to join the wireless radio network specified by the radio channel and network ID.

Figure 4C:
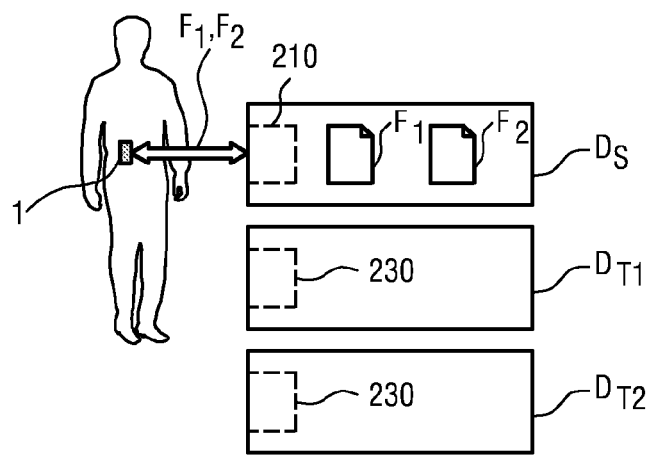

In FIG. 4c, a wireless radio connection is established between the memory device 1 and the source device $D_S$, as indicated by the solid white arrow. The connection interface sends copies of the files $F_1$, $F_2$ accompanied by the corresponding labels via its RF-transceiver from the source device $D_S$ to the RF-transceiver of the memory device 1. The memory device 1 subsequently stores the incoming data in its memory.

Figure 4D:
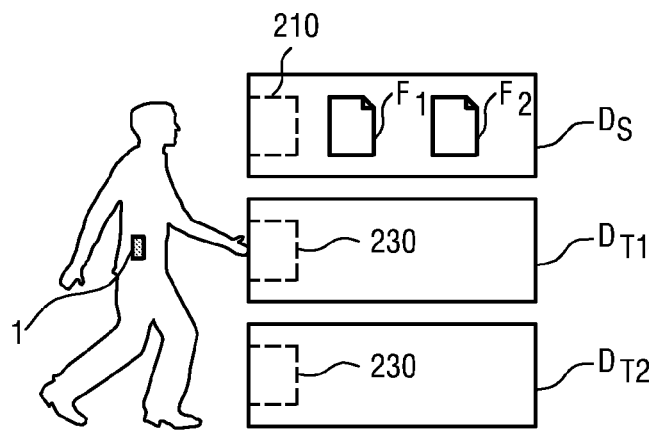

Once copies of the files $F_1$, $F_2$ with their labels have been transferred from the source device $D_S$ to the memory device 1, the connection interface of the source device $D_S$ leaves the wireless connection and shuts down its RF-transceiver. Similarly, the memory device 1 instructs its RF-transceiver to shut down the network, indicating this by, for example, an audible beep or a visible signal. The user 2 now approaches a target device $D_{T1}$, as shown in FIG. 4d and touches the "paste" button in the touch interface 230 of the target device $D_{T1}$.

Figure 4E:
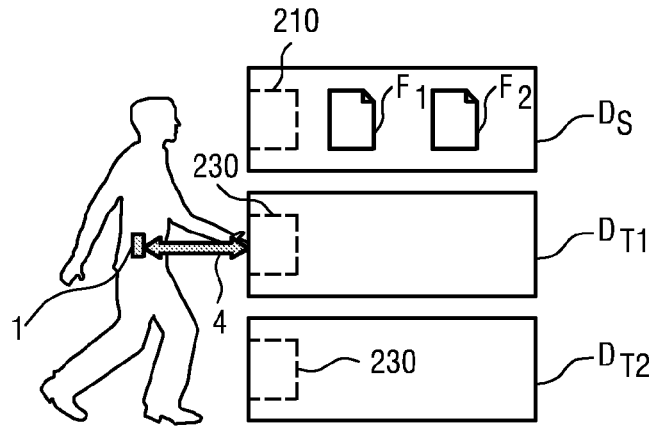

In the same way as described above, the target device $D_{T1}$ wakes up the memory device 1 through body coupled communication, as indicated by the cross-hatched arrow in FIG. 4e. The memory device 1 then specifies the connection parameters 4 for a new wireless radio connection and transmits these connection parameters 4 to the connection interface of the target device $D_{T1}$ through the body of the user 2 via body-coupled communication. Once this transfer is complete, the user 2 can release the touch interface 230 of the target device $D_{T1}$.

Figure 4F:
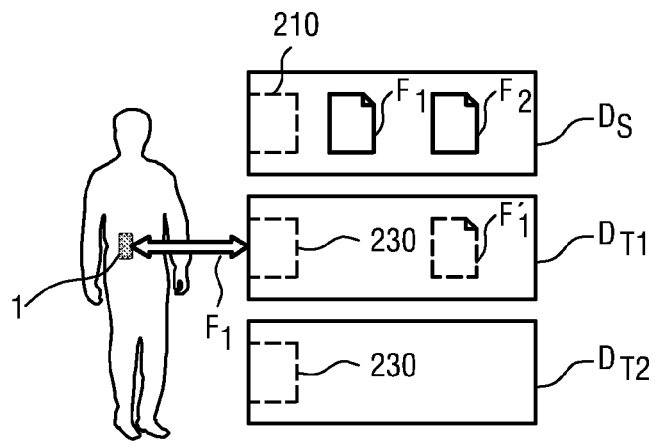

As shown in FIG. 4f, the first target device $D_{T1}$ joins the wireless network, indicated by the solid white arrow, set up by the memory device 1. The first target device $D_{T1}$ then requests the memory device 1 to send any data stored in its memory intended for this target device $D_{T1}$. Upon receipt of this request, the memory device 1 commences sending its copy of the first file $F_1$ to the first target device $D_{T1}$ as data over the radio connection. The first target device $D_{T1}$ commences storing the data in its memory, as a copy $F'_1$ of the original file $F_1$.

Figure 4G:
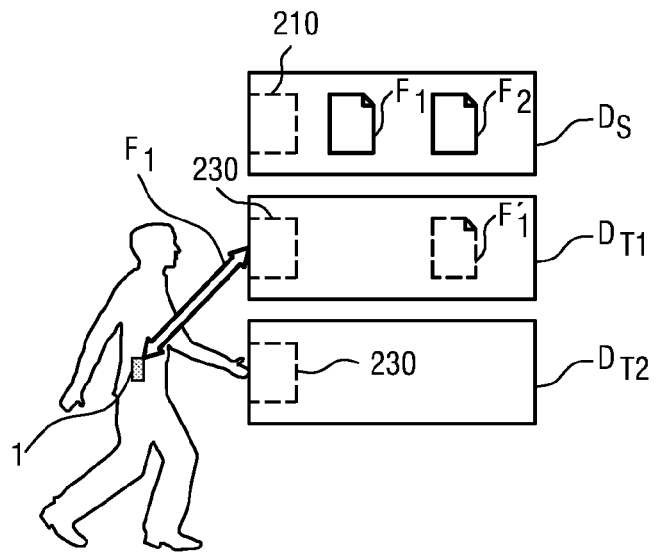

To transfer a copy of the second file $F_2$ to the second target device $D_{T2}$, the user 2 approaches the second target device $D_{T2}$ and touches the "paste" button of the touch interface 230 of that target device $D_{T2}$, as shown in FIG. 4g. In the meantime, the memory device 1 is still transferring data to the first target device $D_{T1}$, as indicated by the file symbol drawn with dashed lines.

Figure 4H:
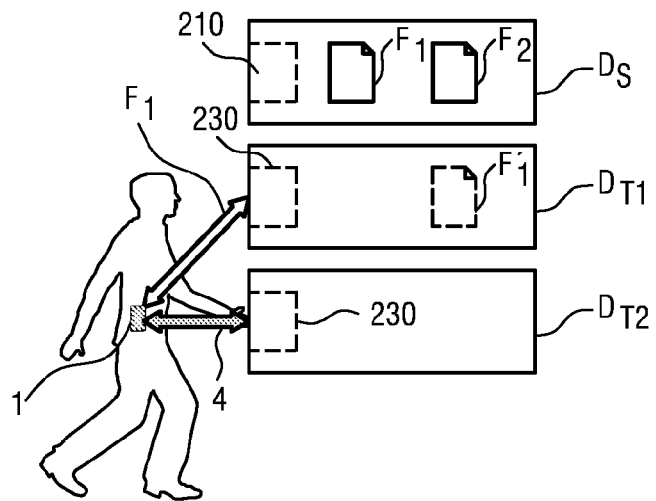

In the manner already described, the second target device $D_{T2}$ wakes up the memory device 1 through body coupled communication, indicated by the solid black arrow in FIG. 4h. Since the memory device 1 has already established a wireless radio connection, it immediately sends the required network connection parameters 4 using body-coupled communication to the second target device $D_{T2}$. The user 2 can now release the second target device $D_{T2}$.

Figure 4I:
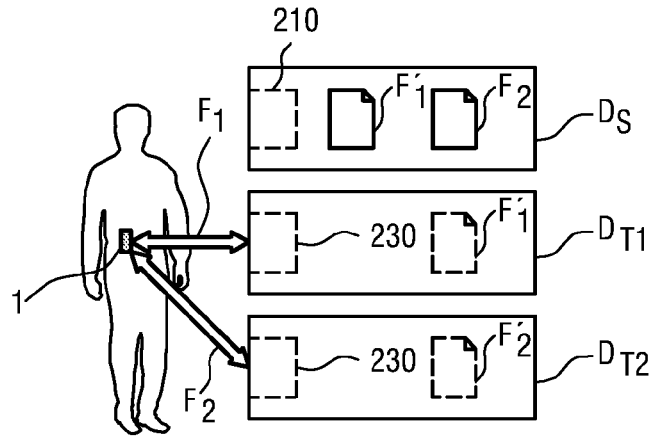

As shown in FIG. 4i, the second target device $D_{T2}$ joins the wireless radio network established by the memory device 1. Both target devices $D_{T1}$, $D_{T2}$ and the memory device 1 are now part of the same wireless radio network, as indicated by the solid white arrows. The second target device $D_{T2}$ requests the memory device 1 to send any data intended for it. Upon receipt of this request, the memory device 1 examines the labels of the files it has received and subsequently starts transmitting the copy of the second file $F_2$ to the second target device $D_{T2}$ over the wireless RF connection, and the second target device $D_{T2}$ commences storing the received data as a copy $F'_2$ of the original file $F_2$ in its memory.

Figure 4J:
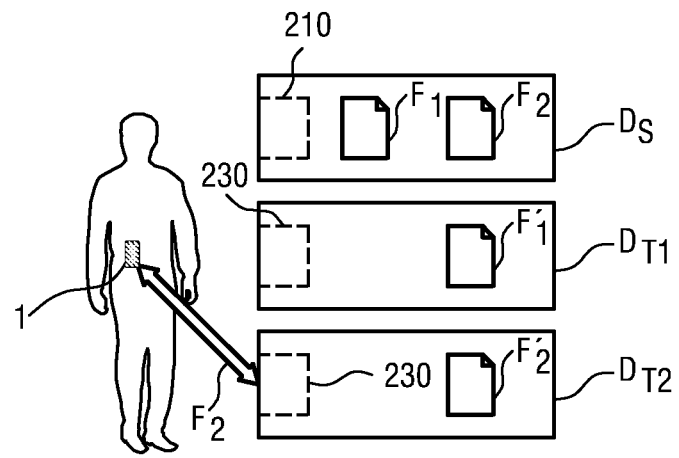
Figure 4K:
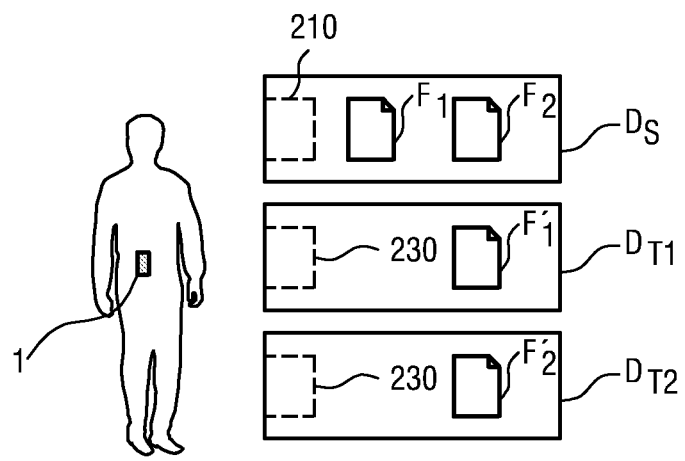

Once the first target device $D_{T1}$ has completed receiving all its requested data, its connection interface instructs its RF-transceiver to leave the network and to power down, as shown in FIG. 4j. In the same way, when the second target device $D_{T2}$ has completed receiving all its requested data, its connection interface instructs its RF-transceiver to leave the network and to power down, as shown in FIG. 4k. Finally, the control software of the memory device 1 instructs its RF-transceivers to close down the network. The original files $F_1$, $F_2$ have now been copied from the source device $D_S$ to the intended target devices $D_{T1}$, $D_{T2}$. Naturally, the user could have copied any number of different files from the source device $D_S$ to either of the target devices $D_{T1}$, $D_{T2}$. Once a file has been transferred from the memory device 1 to its intended target destination, the copy of the file can be deleted from the memory device 1.

Figure 5B:
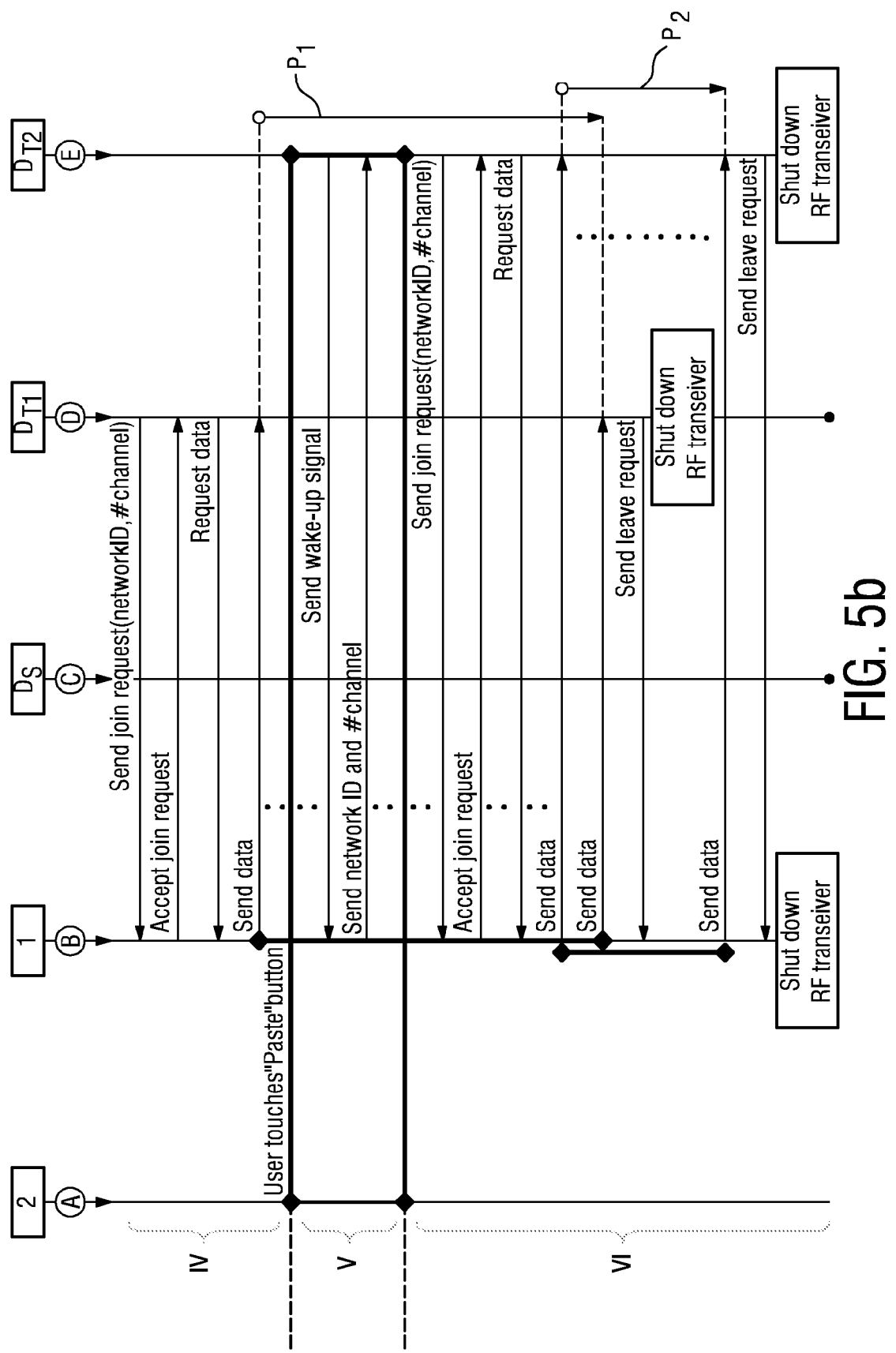

FIG. 5 illustrates the different stages of the data transfer procedure, described in FIGS. 4a-4k, in the form of a message sequence chart. A timeline is shown for the user 2 and each of the devices 1, $D_S$, $D_{T1}$, $D_{T2}$ involved, i.e. the memory device 1, the source device $D_S$, and the two target devices $D_{T1}$, $D_{T2}$. A communication, message, or data transfer from the user to one of the devices or from one device to another is indicated by means of an arrow in the appropriate direction. A solid vertical bar along a timeline indicates the duration of the corresponding stage or data exchange.

In a first stage I, when the user has touched the touch interface of the source device $D_S$—in this case a "copy" button on the touch interface—the BCC transceiver of the source device issues a wake-up signal to the BCC transceiver of the memory device 1. This causes the memory device 1 to set up a network and to exchange the necessary parameters 4—in this case channel number and ID—with the source device, through the body of the user 2. When the parameters 4 have been exchanged, the user 2 can release the touch interface, and a wireless radio network is established using the connection parameters 4.

In the next stage II, the RF transceiver of the source device $D_S$ issues a join request to the RF transceiver of the memory device 1, which in turn issues an acceptance. Once both devices 1, $D_S$ have joined the network in this manner, the application data can be copied from the source device to the memory device in a copy procedure $C_{1,2}$. Once the copy procedure $C_{1,2}$ is complete, the source device $D_S$ issues a leave request to the memory device 1 and shuts down its RF-transceiver. The memory device 1 in turn shuts down its RF-transceiver. The network is no longer active.

In a following stage III, the user approaches a first target device $D_{T1}$ and touches a "paste" button on the touch interface of that device. The BCC transceiver of the first target device $D_{T1}$ issues a wake-up signal to BCC transceiver of the memory device 1. This causes the memory device 1 to set up a network and to exchange the necessary parameters 4 with the first target device $D_{T1}$ through the body of the user 2. When the parameters 4 have been exchanged, the user 2 can release the touch interface, and a wireless radio network is established between the memory device 1 and the first target device $D_{T1}$ using the connection parameters 4.

Subsequently, in a stage IV, the RF transceiver of the first target device $D_{T1}$ issues a join request to the RF transceiver of the memory device 1, which in turn issues an acceptance. Once both devices 1, $D_{T1}$ have joined the new network, the application data can be copied in a paste transfer $P_1$ from the memory device 1 to the first target device $D_{T1}$.

During this paste transfer $P_1$ the user decides to transfer data intended for the second target device $D_{T2}$. To this end, in stage V, the user touches a "paste" button on the touch interface of the second target device $D_{T2}$. The BCC transceiver of the second target device $D_{T2}$ issues a wake-up signal to BCC transceiver of the memory device 1. This causes the memory device 1 provide the second target device $D_{T2}$ with the parameters 4 for the existing network through the body of the user 2. When the network parameters 4 have been exchanged, the user 2 can release the touch interface, and the second target device $D_{T2}$, in stage VI, can join the existing wireless radio network already established between the memory device 1 and the first target device $D_{T1}$, and issues a data request, upon which the memory device 1 commences transferring the intended data to the second target device $D_{T2}$ in a paste transfer procedure $P_2$.

Once a paste transfer procedure $P_1$, $P_2$ has completed, the corresponding RF-transceiver can issue a leave or shut-down request, so that the RF-transceivers of the first and second target devices $D_{T1}$, $D_{T2}$ are shut down, so that, ultimately, the network ceases to exist.

As shown in the above descriptions, the networks required for the transfer of data between a memory device and a source or target device need only exist for as long as it takes to transfer the actual data. Thereafter, the networks can be shut down. As a result, the devices making use of this type of data transfer can feature an attractively low power consumption.

Although the present invention has been disclosed in the form of preferred embodiments and variations thereon, it will be understood that numerous additional modifications and variations could be made thereto without departing from the scope of the invention. For the sake of clarity, it is to be understood that the use of "a" or "an" throughout this application does not exclude a plurality, and "comprising" does not exclude other steps or elements. A "unit" or "module" can comprises a number of units or modules, unless otherwise stated.

The invention claimed is:

1. A method of transferring application data (F1, F2) from a first device (Ds) to a second device (DT1, DT2) via an intermediary memory device conveyed on the person of a user, which method comprises:
   a) connecting the first device (Ds) to the memory device via intra-body communication, wherein said connection is established via a touch interface of the first device (Ds);
   b) sending a network initiation signal from the first device (Ds) to the memory device via said intra-body communication;
   c) exchanging connection-related data including network parameters between the first device (Ds) and the memory device via said intra-body communication to establish a first network between the first device (Ds) and the memory device;
   d) setting up the first network by the memory device;
   e) transferring application data (F1, F2) from the first device (Ds) to the memory device over the connection between the first device (Ds) and the memory device, established on the basis of the connection-related data;
   f) storing the application data (F1, F2) in a memory of the memory device;
   g) decoupling the first network connection between the first device (Ds) and the memory device;
   h) connecting the memory device to the second device (DT1, DT2) via intra-body communication, wherein said connection is established via a touch interface of the second device (DT1, DT2), wherein the touch interface comprises a number of touchable regions for a corresponding number of distinct application data transfer types;
   i) sending a network initiation signal from the memory device to the second device (DT1, DT2) via said intra-body communication;
   j) exchanging further connection-related data including network parameters between the memory device and the second device (DT1, DT2), via said intra-body communication to establish a second network between the memory device and the second device (DT1, DT2);
   k) setting up the second network by the memory device;
   l) transferring at least part of the application data (F1, F2) from the memory of the memory device to the second device (DT1, DT2) over said second network connection, between the memory device and the second device (DT1, DT2), established on the basis of the further connection-related data, and
   m) decoupling the second network connection between the second device (DT1, DT2) and the memory device.

2. A method according to claim 1, wherein a wireless radio connection between the memory device and the corresponding device ($D_S$, $D_{T1}$, $D_{T2}$) is established on the basis of the connection-related data exchanged between the memory device (1) and the device ($D_S$, $D_{T1}$, $D_{T2}$), and the application data ($F_1$, $F_2$) are transferred between the memory device (1) and the device ($D_S$, $D_{T1}$, $D_{T2}$) over the wireless radio connection (N).

3. A method according to claim 1, wherein the direction of transfer of the application data ($F_1$, $F_2$) between the memory device (1) and a device ($D_S$, $D_{T1}$, $D_{T2}$) is determined by the type of contact made by the user with the device ($D_S$, $D_{T1}$, $D_{T2}$).

4. A method according to claim 3, wherein the type of transfer of the application data ($F_1$, $F_2$) between the memory device and a device ($D_S$, $D_{T1}$, $D_{T2}$) is indicated to be a copy transfer type or a paste transfer type or a move transfer type.

5. A method according to claim 1, wherein a label ($L_1$) is specified for the application data ($F_1$, $F_2$) and the label ($L_1$) is transferred with the application data ($F_1$, $F_2$) to the memory device.

6. A method according to claim 5, wherein the label ($L_1$) comprises a specification of a lifetime for the application data ($F_1$, $F_2$) and/or a specification of the number of times the application data ($F_1$, $F_2$) can be transferred from the memory device to a second device ($D_{T1}$, $D_{T2}$) and/or a specification of the second device ($D_{T1}$, $D_{T2}$) to which the application data ($F_1$, $F_2$) can be transferred from the memory device.

7. A data transfer system for transferring application data (F1, F2) between a first device (Ds) and a second device (DT1, DT2), comprising:
   a memory device for conveyance on the person of a user, which memory device comprises
   a memory for intermediate storage of application data (F1, F2),
   a connection interface for exchanging connection-related data with a device (Ds, DT1) through the body of a user, wherein the connection-related data includes network parameters used for establishing a connection,
   and a data transfer arrangement for receiving application data (F1, F2) from a first device (Ds) over a first network and for transmitting application data (F1, F2) to a second device (DT1, DT2) over a second data network, between the memory device and the second device (DT1, DT2), wherein the first and second data networks are established on the basis of the connection-related data, wherein the first and second data networks are generated by the memory device in response to signals received from a first touch interface assigned to the first device (Ds) and the touch interface assigned to the second device (DT1, DT2) and, assigned to the first device (Ds), the touch interface and connection interface combination for exchanging connection-related data between the first device (Ds) and a memory device through the body of the user and a data transfer arrangement for transmitting application data (F1, F2) from the first device (Ds) to the memory device over a connection, between the first device (Ds) and the memory device, established on the basis of the connection-related data, wherein the touch interface comprises a number of touchable regions for a corresponding number of distinct application data transfer types;

and, assigned to the second device (DT1, DT2), the touch interface and connection interface combination for exchanging connection-related data between the second device (DT1, DT2) and a memory device through the body of the user, and a data transfer arrangement for transmitting application data (F1, F2) from the memory device to the second device (DT1, DT2) over a connection, between the memory device and the second device (DT1, DT2), established on the basis of the connection-related data.

8. A data transfer system according to claim 7, wherein a touch interface of a device ($D_S$, $D_{T1}$, $D_{T2}$) comprises a number of touchable regions for a corresponding number of distinct application data transfer types between the device ($D_S$, $D_{T1}$, $D_{T2}$) and a memory device and/or a detection unit for detecting the type of contact made by the user with the touch interface for a variety of application data transfer types.

9. A device ($D_S$, $D_{T1}$, $D_{T2}$) for utilising application data ($F_1$, $F_2$), comprising:
 a touch interface and connection interface combination for sending a network initiation signal and exchanging connection-related data between the device ($D_S$, $D_{T1}$, $D_{T2}$) and a memory device, wherein the connection-related data includes network parameters comprising connection related data including at least a frequency of a radio channel over which data is to be exchanged and a network identifier, used for establishing a network between the device ($D_S$, $D_{T1}$, $D_{T2}$) and the memory device, wherein the touch interface comprises a number of touchable regions for a corresponding number of distinct application data transfer types;
 a data transfer arrangement for transferring application data ($F_1$, $F_2$) between the device ($D_S$, $D_{T1}$, $D_{T2}$) and the memory device over the connection between the memory device and the device ($D_S$, $D_{T1}$, $D_{T2}$), established on the basis of the connection-related data.

10. A memory device for intermediate storage of application data (F1, F2) in transfer from a first device (Ds) to a second device (DT1, DT2), comprising:
 a connection interface for receiving a network initiation signal and exchanging connection-related data with a device (Ds, DT1, DT2) through the body of a user, wherein the connection-related data includes network parameters comprising connection related data including at least a frequency of a radio channel over which data is to be exchanged and a network identifier, used for establishing a network;
 a touch interface, wherein the touch interface comprises a number of touchable regions for a corresponding number of distinct application data transfer types;
 a data transfer arrangement for receiving application data (F1, F2) from a first device (Ds) over a first network and for transmitting application data (F1, F2) to a second device (DT1, DT2) over a second network, wherein said first and second networks are established on the basis of the connection-related data;
 a memory for storing application data (F1, F2).

11. A data transfer front end for interfacing between a device (D) and a memory device according to claim 10, comprising
 a data interface for transferring application data ($F_1$, $F_2$) from the device (D) to the data transfer front end;
 a touch interface and connection interface combination for exchanging connection-related data between the data transfer front end and the memory device, wherein the connection-related data includes network parameters used for establishing a connection;
 a data transfer arrangement for transferring application data (F1, F2) between the device (D) and the memory device over a connection established between the data transfer front end and the memory device on the basis of the connection-related data.

12. A device ($D_S$, $D_{T1}$, $D_{T2}$) according to claim 9, wherein the distinct transfer types include copy, move, paste.

13. A device (Ds, DT~, DT2) for utilizing application data (F1, F2), comprising:
 a touch interface and connection interface combination for sending a network initiation signal and exchanging connection-related data between the device (Ds, DT1 DT2) and a memory device, wherein the connection-related data includes network parameters comprising connection related data including at least a frequency of a radio channel over which data is to be exchanged and a network identifier, used for establishing a network between the device (Ds, DT1 DT2) and the memory device, wherein the touch interface comprises a suitable detection unit for detecting the type or sequence of contact made by a user, wherein the touch interface comprises a number of touchable regions for a corresponding number of distinct application data transfer types;
 a data transfer arrangement for transferring application data (F1, F2) between the device (Ds, DT1, DT2) and the memory device over the connection between the memory device and the device (Ds, DT1, DT2), established on the basis of the connection-related data.

* * * * *